United States Patent
Gupta et al.

(10) Patent No.: US 8,782,582 B1
(45) Date of Patent: Jul. 15, 2014

(54) EFFICIENT METHOD TO ANALYZE RTL STRUCTURES THAT CAUSE PHYSICAL IMPLEMENTATION ISSUES BASED ON RULE CHECKING AND OVERLAP ANALYSIS

(71) Applicant: Atrenta, Inc., San Jose, CA (US)

(72) Inventors: Jitendra Gupta, Pleasanton, CA (US); Ashima Dabare, Noida (IN); Kshitiz Krishna, Noida (IN); Sanjiv Mathur, Noida (IN); Ravi Varadarajan, Fremont, CA (US)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/954,097

(22) Filed: Jul. 30, 2013

Related U.S. Application Data

(60) Provisional application No. 61/780,488, filed on Mar. 13, 2013.

(51) Int. Cl.
G06F 17/50 (2006.01)
(52) U.S. Cl.
USPC .......................................... 716/106
(58) Field of Classification Search
USPC .......................................... 716/106
See application file for complete search history.

(56) References Cited

U.S. PATENT DOCUMENTS

| | | | |
|---|---|---|---|
| 6,068,662 A | 5/2000 | Scepanovic et al. | |
| 6,668,365 B2 | 12/2003 | Harn | |
| 7,082,584 B2 | 7/2006 | Lahner et al. | |
| 7,114,142 B1 | 9/2006 | Segal et al. | |
| 7,225,116 B2 | 5/2007 | Harn | |
| 7,299,442 B2 | 11/2007 | Alpert et al. | |
| 7,401,313 B2 | 7/2008 | Galatenko et al. | |
| 7,971,174 B1 | 6/2011 | Khalsa et al. | |
| 8,024,693 B2 | 9/2011 | Adams et al. | |
| 8,108,809 B2 | 1/2012 | Sadakane et al. | |
| 8,122,420 B1 | 2/2012 | Kannan et al. | |
| 8,185,858 B2 | 5/2012 | Okamoto | |
| 8,239,797 B1 | 8/2012 | Ghosh et al. | |
| 8,250,512 B2 | 8/2012 | Lo et al. | |
| 8,370,783 B2 | 2/2013 | Uchino et al. | |
| 8,438,508 B2 * | 5/2013 | Liu | 716/54 |
| 2008/0127000 A1 * | 5/2008 | Majumder et al. | 716/2 |
| 2011/0099526 A1 * | 4/2011 | Liu | 716/54 |
| 2012/0216156 A1 * | 8/2012 | Liu et al. | 716/52 |
| 2013/0311958 A1 * | 11/2013 | Liu | 716/53 |

* cited by examiner

*Primary Examiner* — Suchin Parihar
(74) *Attorney, Agent, or Firm* — Thomas Schneck; Mark Protsik

(57) ABSTRACT

This invention provides a method for detecting physical implementation hot-spots in a pre-placement integrated circuit design. The method first identifies physical issues at an object level. Physical issues include timing, routing congestion, clocking, scan, power, and thermal. The method then analyzes these physical issues over a collection of connected logic cell and large cell instances and determines a physical implementation hot-spot severity based on the number and severity of physical issues as well as the number of objects in the related collection.

22 Claims, 4 Drawing Sheets

EFFICIENT METHOD TO ANALYZE RTL STRUCTURES THAT CAUSE PHYSICAL IMPLEMENTATION ISSUES BASED ON RULE CHECKING AND OVERLAP ANALYSIS

CROSS-REFERENCE TO RELATED APPLICATION

This application claims priority under 35 U.S.C. 119(e) from prior U.S. provisional application No. 61/780,488, filed Mar. 13, 2013.

TECHNICAL FIELD

This invention relates to the analysis of integrated circuit (IC) designs for physical implementation failures. The invention specifically relates to analysis of a structural design before the floor planning, cell placement and routing steps of a typical IC implementation flow. Physical issues include timing, congestion, clocking, scan, power/thermal, physical-hierarchy, and multi-power domain issues.

BACKGROUND ART

The physical implementation of IC designs developed using Hardware Description Languages (HDL), such as Verilog and VHDL, is a tedious, effort and time-intensive process. The main IC design development steps are typically high-level architecture definition, RTL code development, functional verification, synthesis and timing optimization, floor planning, cell placement and timing optimization, routing and final verification. If a design is unable to meet design timing or successfully complete routing in the planned floor plan or block area, then it is considered a physical implementation failure. Physical implementation failures are found late in the development cycle. In advanced technology processes such as 40 nm and below, the larger design sizes and smaller geometries exacerbate the risk of physical implementation failure. This creates a significant time and development cost risk for a design team.

The design team attempts to resolve physical implementation issues with a combination of methods: (i) decrease the design utilization, i.e. implement the block with larger silicon area; (ii) change the floor plan to allocate more area for the affected block, often causing a sub-optimal floor plan and degradation in design performance; and (iii) change the design itself by changing the design's HDL description. Each of the methods creates a significant loss in terms of increased time to design implementation completion, time to market for the finished product, larger silicon area, reduced performance and clock frequency, risk of not fitting into chosen chip package, and higher development cost.

Given the high cost of resolving physical implementation issues, a method to predict such issues at the pre-floorplan stage of design development is very valuable to design development teams. By predicting such issues early in the development cycle, the development team can take corrective steps before going to physical implementation, and hence significantly reduce risk to timely completion and overall cost of development.

Existing electronic design automation (EDA) tools try to detect physical implementation issues by applying checking-rules to each of the objects in the design. The checking rules look for high fan-in, high fan-out, large multiplexors and other properties. EDA systems attempt to identify timing critical paths.

Existing EDA tools do not consider the interactions of the detected physical implementation issues. A critical timing path issue might normally indicate placing and routing instances close together. A routing congestion issue might normally indicate spreading out the layout. If both issues are present in close proximity the risk of a physical implementation failure is greatly increased.

SUMMARY DISCLOSURE

A method is provided for analyzing physical implementation issues in a pre-placement integrated circuit design. The method is implemented in a computing system having at least one processing unit and a memory accessible by the processing unit. The memory stores a hardware description of at least a portion of the circuit design, and also storing a set of program instructions of a physical hotspot debug tool that when executed by the processing unit causes the system to perform the steps of the method.

In particular, the system receives into the memory a hardware description of at least a portion of the pre-placement integrated circuit design. From this stored description the system's processing unit analyzes for each logic cell a set of physical issue metrics and identifies any logic cell having a value for at least one such metric exceeding a corresponding specified threshold. For each identified logic cell, a physical issue severity is measured, based on the values of all metrics exceeding said corresponding thresholds. Next, any collection of identified logic cells based on proximity of the respective identified logic cells is determined, along with related physical issue metrics. For each determined collection, a hotspot severity metric is analyzed, based on the physical issue severity of each logic cell in the collection. Finally, a physical implementation hotspot severity report for the analyzed collections is output.

DETAILED DESCRIPTION

Figure 1:
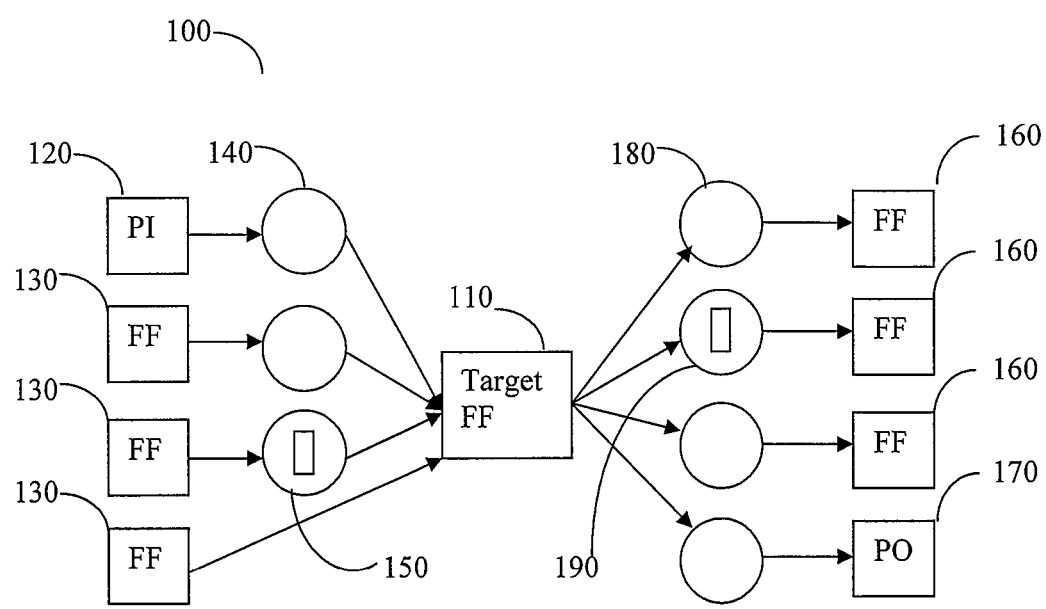
FIG. 1 shows a logic design that illustrates physical issue metrics.

FIG. 1 shows a logic design for illustrating physical issue metrics. The example logic design, 100, contains flip-flops (FF), 110, 130 and 160; primary-input (PI), 120; primary-output (PO), 170; and combinatorial logic blocks, 140, 150 and 190. Combinatorial logic blocks 150 and 190 each contain a multiplexor. The fan-in cone metric (FICN) of a logic cell counts the number of primary-inputs and flip-flops that drive an input of the cell. Cell, 110, is driven by PI, 120, and three FF, 130. It has FICN value of 4. The fan-out cone metric (FOCN) of a logic cell counts the number of primary-outputs and flip-flops driven by the cell. Cell, 110, drives PO, 170, and three FF, 160. It has FOCN value of 4. The fan-in logic depth (FILD) metric measures the logic depth of the fan-in cone. The fan-out logic depth (FOLD) metric measures the logic depth of the fan-out cone. The fan-in large multiplexor (FILM) metric measures large multiplexors in the fan-in. The fan-out large multiplexor (FOLM) metric measures large multiplexors in the fan-out. All metrics have a threshold limit. Metric values below the threshold are ignored.

Critical objects are logic cells that have multiple metric values exceeding their threshold. Critical object severity is computed as the sum of normalized metric values. Logic designers can specify scaling factors for individual metrics.

Figure 2:
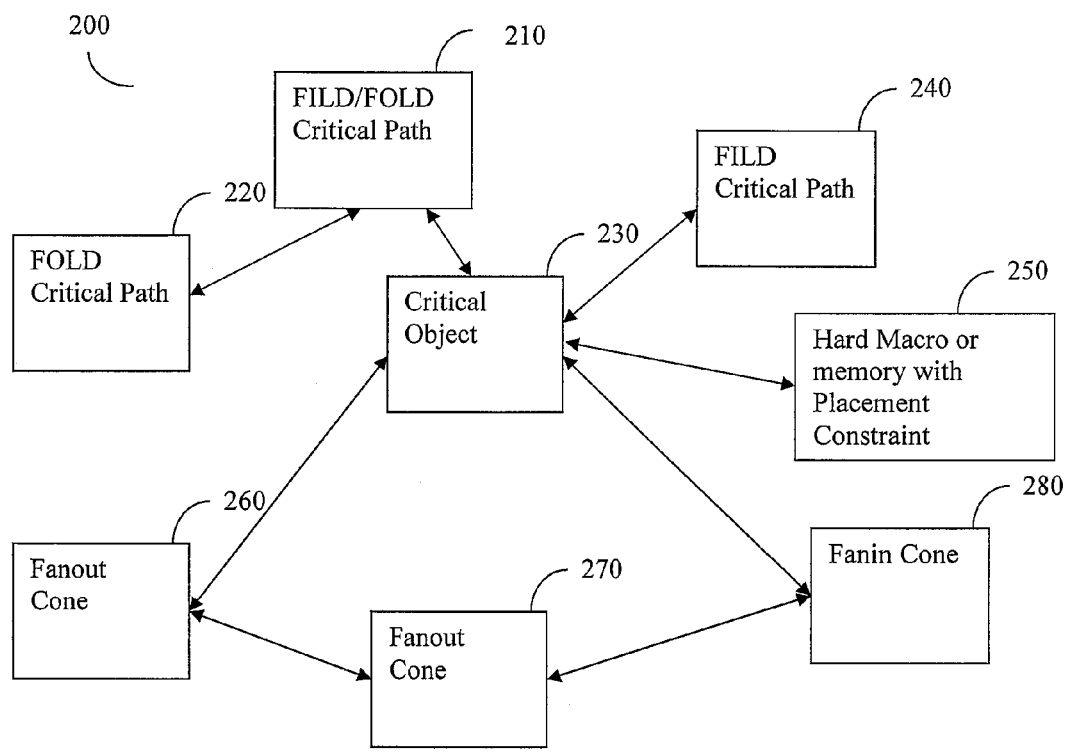
FIG. 2 shows a physical implementation hotspot for a collection of objects.

FIG. 2 gives an example of a physical hotspot. The physical hotspot consists of a collection of connected objects with physical issues. Object 210 has a high FILD value and a high FOLD value. High FILD and FOLD values can indicate a critical timing path. Object 220 has high FOLD value. Object 220 connects to object 210. FILD and FOLD issues can complement each other. Placing objects 210 and 220 close to each other can solve both issues. Two connected objects with FILD and FOLD issues will not form a hotspot collection unless they connect to other objects. In FIG. 2, objects 210 and 230 are added to the hotspot collection because object 210 connects to object 230.

Object 230 is a critical object that connects to multiple objects, 210, 240, 250, 260 and 280. Object 240 has a high FILD value. Object 250 is a Hard-Macro (HM) or memory object with placement constraints. Objects 260 and 270 have high FOCN values. Object 280 has a high FICN value.

Figure 3:
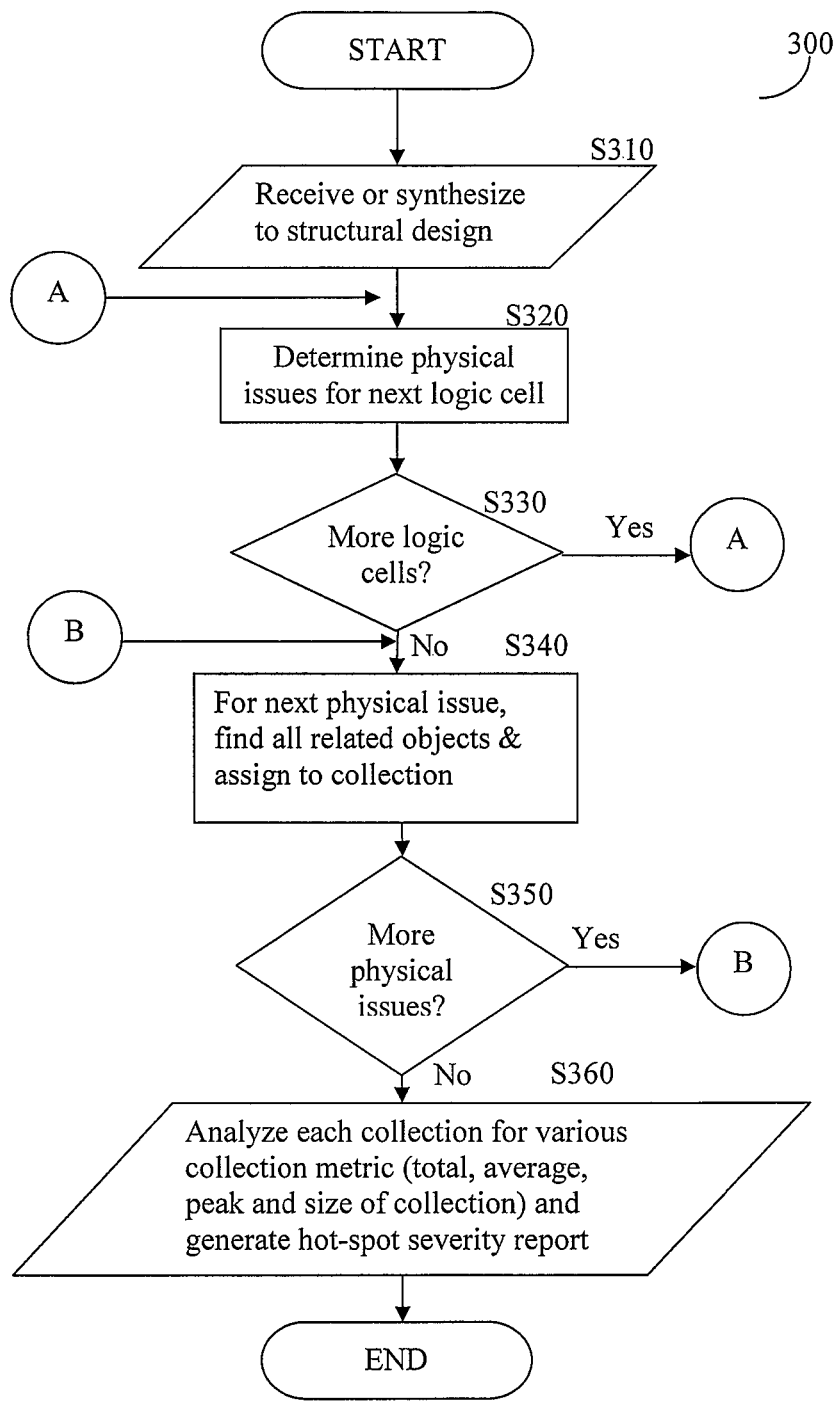
FIG. 3 shows a flowchart for detecting physical implementation hotspots.

FIG. 3 is an exemplary and non-limited flowchart for determining physical implementation hotspots. In S310 the physical hotspot debug tool, 420, receives a structural design or synthesizes a structural design. In S320 it detects physical issues in the next logic cell. In S320 it processes the first logic cell on the first iteration and subsequent logic cells on subsequent iterations. In one embodiment it detects physical issues in flip-flop, primary-input and primary-output logic cells only. In one embodiment the physical issues detected include FICN, FOCN, FILD, FOLD, FILM, FOLM, critical object and placement constraints. The physical issue severity may be measured based on raw metrics as described above, or by weighing the metric based on timing-criticality or placement-criticality of the underlying objects. In another embodiment, the physical hotspot debug tool, 420, analyzes the circuit and determines the most timing critical paths. It determines timing critical paths by looking at logic depth, logic cell delays, fan-out, fan-in and end-user-specified timing constraints. In S330 the physical hotspot debug tool, 420, checks if there are more logic cells to check. If there are more logic cells to process it continues at S320; otherwise it continues at S340.

In S340 the physical hotspot debug tool, 420, checks if the next physical issue belongs to a collection and if so, assigns it to a collection. In S340 it processes the first physical issue on the first iteration and subsequent physical issues on subsequent iterations. It determines whether an issue belongs to a collection by the proximity of the respective logic cells. In one embodiment the physical hotspot debug tool, 420, includes physical issues that where the logic cells connect together. In S340 the physical hotspot debug tool, 420, will join collections if the physical issue belongs to more than one collection. In S350 the physical hotspot debug tool, 420, checks if there more physical issues to process. If there are more issues it continues at S340, otherwise it continues at S360.

In S360 the physical hotspot debug tool, 420, analyzes the collections and generates a physical hotspot severity report. The physical hotspot debug tool, 420, filters out complementary issues such as two objects with FILD and FOLD issues. For each collection, the physical hotspot debug tool, 420, counts the number of objects and issues. It computes a total severity score by summing normalized metric severities. The normalized metric severity is derived by relative scaling of different metrics based on the design and technology for which hotspot report is used. The normalized metric computation uses the raw metric value modified by the timing-criticality or placement criticality of underlying object. It computes the average severity score from the normalized metric severities. It also determines the physical issue with maximum severity score.

Figure 4:
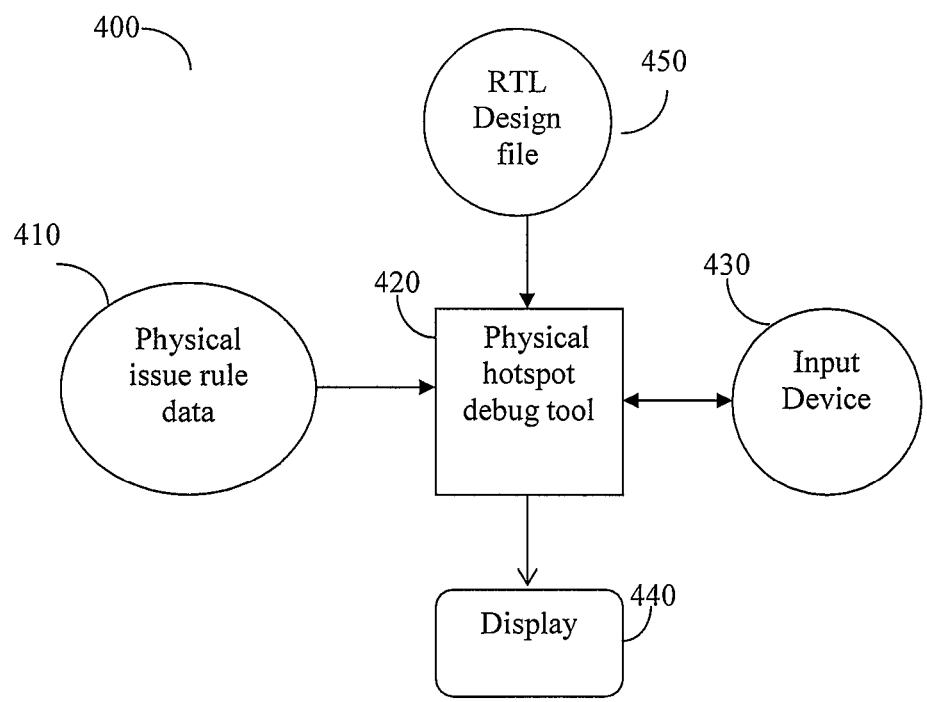
FIG. 4 shows a physical hotspot debug tool.

FIG. 4 is an exemplary and non-limited diagram showing a physical hotspot debug tool, 420. The physical hotspot debug tool, 420 runs as an application program on a central processing unit (CPU). The physical hotspot debug tool, 420, interacts with a logic designer through an input device, 430 and a display, 440. It displays the physical hotspot results on the display, 440. It allows a logic designer to change thresholds and scaling factors through the input device, 430. The physical hotspot debug tool, 420, reads a structural design, 450. The physical hotspot debug tool, 420, reads physical issue rule data, 410. The physical issue rule data lists the types of rules to use for the required silicon technology. It includes default thresholds and scaling factors.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory accessible to the one or more processing units and storing both the application program and any received hardware description of at least a portion of an integrated circuit design, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method implemented in a computing system for analyzing physical implementation issues in a pre-placement integrated circuit design, comprising:

receiving in the system a hardware description of a pre-placement integrated circuit design;

analyzing for each logic cell in the received hardware description a set of physical issue metrics and identifying any logic cell having a value for at least one such metric exceeding a corresponding specified threshold;

measuring for each identified logic cell a physical issue severity based on the values of all metrics exceeding said corresponding thresholds, the physical issue severity for any identified logic cell being computed as a sum of normalized metric values for that logic cell;

determining any collection of identified logic cells based on proximity of the respective identified logic cells with related physical issue metrics;

analyzing for each determined collection a hotspot severity metric based on the physical issue severity of each logic cell in the collection; and outputting a physical implementation hotspot severity report for the analyzed collections.

2. The method as in claim 1, wherein the set of physical issue metrics include any one or more of a fan-in cone (FICN) metric representing a number of primary-inputs and flip-flops that drive a logic cell in the received circuit design; a fan-out cone (FOCN) metric representing a number of primary-outputs and flip-flops driven by a logic cell in the received circuit design; a fan-in logic depth (FILD) metric representing a logic depth of a fan-in cone of a logic circuit in the received circuit design; a fan-out logic depth (FOLD) metric representing a logic depth of a fan-out cone of a logic circuit in the received circuit design; a fan-in large multiplexor (FILM) metric representing a measure of any large multiplexors in a fan-in cone of a logic circuit in the received circuit design; and a fan-out large multiplexor (FOLM) metric representing a measure of any large multiplexors in a fan-out cone of a logic circuit in the received circuit design.

3. The method as in claim 1, wherein thresholds for each physical issue metric are user specifiable.

4. The method as in claim 1, wherein scaling factors for normalizing metric values in computing the physical issue severity are user specifiable.

5. The method as in claim 1, wherein logic cell proximity for determining membership in any collection of logic cells is a physical connection between identified logic cells in the received description of the circuit design.

6. A method implemented in a computing system for analyzing physical implementation issues in a pre-placement integrated circuit design, comprising:
  receiving in the system a hardware description of a pre-placement integrated circuit design;
  analyzing for each logic cell in the received hardware description a set of physical issue metrics and identifying any logic cell having a value for at least one such metric exceeding a corresponding specified threshold;
  measuring for each identified logic cell a physical issue severity based on the values of all metrics exceeding said corresponding thresholds;
  determining any collection of identified logic cells based on proximity of the respective identified logic cells with related physical issue metrics;
  analyzing for each determined collection a hotspot severity metric based on the physical issue severity of each logic cell in the collection, wherein the hotspot severity metric is computed as a sum of weighted physical severity metrics for each logic cell in a collection; and
  outputting a physical implementation hotspot severity report for the analyzed collections.

7. The method as in claim 6, wherein scaling factors for the physical severity metrics are user specifiable.

8. The method as in claim 6, wherein scaling factors for the physical severity metrics are based on at least one of timing criticality and placement criticality of the logic cells in the collection.

9. The method as in claim 8, wherein timing criticality of each logic cell is determined from any one or more of logic depth, logic cell delay, fan-in, fan-out and user-specified timing constraints.

10. The method as in claim 1, wherein analyzing for each determined collection a hotspot severity metric includes a filtering out of identified complementary issues between connected logic cells in a collection.

11. A computer software product containing instructions embodied as an executable program in a tangible computer-readable medium that, when executed in a computing system, perform the method of claim 1.

12. A computing system for analyzing physical implementation issues in a pre-placement integrated circuit design, comprising at least one processing unit and a memory accessible by the processing unit, the memory storing a hardware description of at least a portion of the circuit design, the memory also storing a set of program instructions of a physical hotspot debug tool that when executed by the processing unit causes the system to:
  analyze, for each logic cell in the hardware description stored in the memory, a set of physical issue metrics and identify any logic cell having a value for at least one such metric that exceeds a corresponding specified threshold;
  measure, for each identified logic cell, a physical issue severity based on the values of all metrics exceeding said corresponding thresholds, the physical issue severity for any identified logic cell being computed as a sum of normalized metric values for that logic cell;
  determine any collection of identified logic cells based on proximity of the respective identified logic cells with related physical issue metrics;
  analyze, for each determined collection, a hotspot severity metric based on the physical issue severity of each logic cell in the collection; and
  output a physical implementation hotspot severity report for the analyzed collections.

13. A system as in claim 12, wherein the set of physical issue metrics include any one or more of a fan-in cone (FICN) metric representing a number of primary-inputs and flip-flops that drive a logic cell in the stored circuit design; a fan-out cone (FOCN) metric representing a number of primary-outputs and flip-flops driven by a logic cell in the stored circuit design; a fan-in logic depth (FILD) metric representing a logic depth of a fan-in cone of a logic circuit in the stored circuit design; a fan-out logic depth (FOLD) metric representing a logic depth of a fan-out cone of a logic circuit in the stored circuit design; a fan-in large multiplexor (FILM) metric representing a measure of any large multiplexors in a fan-in cone of a logic circuit in the stored circuit design; and a fan-out large multiplexor (FOLM) metric representing a measure of any large multiplexors in a fan-out cone of a logic circuit in the stored circuit design.

14. The system as in claim 12, wherein thresholds for each physical issue metric are user specifiable.

15. The system as in claim 12, wherein scaling factors for normalizing metric values in computing the physical issue severity are user specifiable.

16. The system as in claim 12, wherein logic cell proximity for determining membership in any collection of logic cells is a physical connection between identified logic cells in the received description of the circuit design.

17. A computing system for analyzing physical implementation issues in a pre-placement integrated circuit design, comprising at least one processing unit and a memory accessible by the processing unit, the memory storing a hardware description of at least a portion of the circuit design, the memory also storing a set of program instructions of a physical hotspot debug tool that when executed by the processing unit causes the system to:
  analyze, for each logic cell in the hardware description stored in the memory, a set of physical issue metrics and identify any logic cell having a value for at least one such metric that exceeds a corresponding specified threshold;
  measure, for each identified logic cell, a physical issue severity based on the values of all metrics exceeding said corresponding thresholds;
  determine any collection of identified logic cells based on proximity of the respective identified logic cells with related physical issue metrics;
  analyze, for each determined collection, a hotspot severity metric based on the physical issue severity of each logic cell in the collection, wherein the hotspot severity metric is computed as a sum of weighted physical severity metrics for each logic cell in a collection; and output a physical implementation hotspot severity report for the analyzed collections.

18. The system as in claim 17, wherein scaling factors for the physical severity metrics are user specifiable.

19. The system as in claim 17, wherein scaling factors for the physical severity metrics are based on at least one of timing criticality and placement criticality of the logic cells in the collection.

20. The system as in claim 19, wherein timing criticality of each logic cell is determined from any one or more of logic depth, logic cell delay, fan-in, fan-out and user-specified timing constraints.

21. The system as in claim 12, wherein analyzing for each determined collection a hotspot severity metric includes a filtering out of identified complementary issues between connected logic cells in a collection.

22. The system as in claim 12 that comprises a programmable general-purpose computer system or a computer-aided design (CAD) system.

* * * * *